(12) United States Patent
Kim et al.

(10) Patent No.: US 7,133,246 B2
(45) Date of Patent: Nov. 7, 2006

(54) POLE BASE ASSEMBLY DRIVING DEVICE FOR TAPE RECORDER

(75) Inventors: Bong-joo Kim, Suwon (KR); Jun-young Kim, Suwon (KR); Jae-kab Seo, Suwon (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 191 days.

(21) Appl. No.: 10/679,380

(22) Filed: Oct. 7, 2003

(65) Prior Publication Data

US 2004/0125499 A1   Jul. 1, 2004

(30) Foreign Application Priority Data

Dec. 30, 2002   (KR) ............... 10-2002-0086840

(51) Int. Cl.
  *G11B 15/665* (2006.01)
(52) U.S. Cl. .......................................... 360/85
(58) Field of Classification Search ............... 360/85
  See application file for complete search history.

(56) References Cited

U.S. PATENT DOCUMENTS 5,597,130 A   1/1997   Chiu et al.
5,982,575 A *  11/1999  Choi ........................... 360/85

* cited by examiner

*Primary Examiner*—R. S. Tupper
(74) *Attorney, Agent, or Firm*—Roylance, Abrams. Berdo & Goodman LLP

(57) ABSTRACT

A pole base assembly driving device for a tape recorder is disclosed. Manufacturing of decks becomes simpler and at lower cost. The pole base assembly driving device has a loading gear rotatably disposed on the deck, and rotated by a driving force which is transmitted from a driving source installed on the deck. The pole base assembly further comprises an elastic rod connected by one end to the loading gear, and connected by the other end to a link member which is connected with the pole base assembly. The elastic rod is preferably made of a material which is elastically bendable by an external force, and preferably comprises a deformation restricting means for restricting a deformation of the elastic rod when the elastic rod is deformed by the rotation of the loading gear, such as protrusions on the concave side of the rod when deformed and a reinforcement member. As a result, the number of parts and manufacturing cost is reduced, and deterioration of durability due to breakage of parts can be avoided.

14 Claims, 5 Drawing Sheets

POLE BASE ASSEMBLY DRIVING DEVICE FOR TAPE RECORDER

CROSS-REFERENCE TO RELATED APPLICATIONS

This application claims benefit under 35 U.S.C. § 119(a) from Korean Patent Application No. 2002-86840 filed on Dec. 30, 2002, in the Korean Intellectual Property Office, the disclosure of which is incorporated herein by reference in its entirety.

BACKGROUND OF THE INVENTION

1. Field of the Invention

The present invention relates to a tape recorder, and more particularly, to a driving device for moving a pole base assembly along a deck so as to move a magnetic tape into and out of close contact with a head drum during magnetic tape loading and unloading.

2. Description of the Related Art

Generally, tape recorders such as a video tape recorders (VTR), camcorders, and the like, have deck mechanisms to record and reproduce data as a magnetic tape runs along a predetermined path defined inside the deck.

FIG. 1 illustrates one example of a moving deck 100, which is typically employed in the tape recorder. The deck 100 of the tape recorder includes a pair of pole base assemblies 140, and a driving device for moving the pole base assemblies 140 along a guide rail 130 of the deck 100 during the loading or unloading of the magnetic tape.

Each of the pole base assemblies 140 includes a base member 141 slidably connected with a guide rail 130, a pole member 145 protruding from an upper surface of the base member 141 and/or a roller member 144. While the guide rail 130 is depicted as being integrally formed with the head drum base 120, which is for seating the head drum 110 on the deck 100, many other variations are available for the structure of the guide rail 130, as will be appreciated by one of ordinary skill in the art.

As shown in FIG. 2, the pole base assembly driving device 150 includes first and second loading gears 153a, 153b, and first and second link members 155a, 155b.

The first and the second loading gears 153a, 153b are disposed on the deck 100 to correspond to the pair of pole base assemblies 140, respectively, and are driven by the force which is transmitted from a loading motor 151 (FIG. 1) via a predetermined gear train including a main gear 152 (FIG. 1).

The first link member 155a is rotatably connected at one of its ends to the base member 141 of the pole base assembly 140. The second link member 155b is rotatably connected at both of its ends to the other end of the first link member 155a and to the loading gears 153a, 153b, respectively. As a result, the pole base assemblies 140 are moved along the guide rail 130 in association with the rotation of the loading gears 153a, 153b.

In order to ensure stable data recording or reproducing with respect to the magnetic tape (not shown), during the loading of the magnetic tape, the pole base assemblies 140 should be in close contact to the terminal end of the guide rail 130 toward the head drum 110, and should also maintain the close contact stably.

To this end, conventionally, the loading motor 151 has been driven for an extra time after the pole base assemblies 140 have contacted the end of the guide rail 130 toward the head drum 110 so as to rotate the loading gears 153a, 153b for a predetermined rotation angle.

However, this way causes excessive pressure on the link members 155a, 155b when the loading gears 153a, 153b are driven past that the point at which the pole base assemblies 140 have contacted the end of the guide rail 130. Also, as the loading and unloading of the magnetic tape is repeated, such over pressure is repeatedly exerted on the link members 155a, 155b, causing the link members 155a, 155b to break and subsequently, causing the durability of the deck 100 to degrade.

In order to solve the above-mentioned problem, conventionally, the pole base assembly driving device 150 added torsion springs (S) inside the loading gears 153a, 153b, respectively, as shown in FIG. 3. The torsion springs (S) are disposed to surround the axes 153c of the loading gears 153a, 153b. The torsion springs preferably have one end fixed to an inner sidewall of the loading gear 153a, 153b and the other end fixed to the second link member 155b which is pivotally connected to the loading gear 153a, 153b.

By this structure, as the loading gears 153a, 153b are rotated past the point at which the pole base assemblies 140 are in contact with the end of the guide rail 130 toward the head drum 110, the loading gears 153a, 153b can be elastically rotated with respect to the second link member 155b within the movement range permitted by the torsion springs (S). Accordingly, the pole base assemblies 140 are in close contact with the end of the guide rail 130, and stay in close contact by the recovery force of the torsion springs (S).

Recently, demand for compact-sized tape recorders has been increasing, and accordingly, components of smaller size and less number are required. However, because the conventional tape recorder requires the loading gears 153a, 153b and the second link member 155b to be pivotally connected with the loading gears 153a, 153b, and also requires torsion springs (S) for the loading gears 153a, 153b, the manufacturing process is relatively complicated and lots of components are required for assembly.

SUMMARY OF THE INVENTION

Accordingly, it is an aspect of the present invention to provide a pole base assembly driving device which requires fewer components and thus has a simpler manufacturing process. It is a further aspect of the present invention to provide a pole base assembly driving device which is capable of elastically moving a pole base assembly to the end of a guide rail tightly during loading of a magnetic tape.

In an effort to achieve the above aspects and other features of the present invention, a pole base assembly driving device for a tape recorder includes a loading gear which is rotatably disposed on a deck and rotated by a driving force from a driving source mounted on the deck. The pole base assembly driving device also includes an elastic rod which is connected by one end to the loading end and to a link member by the other end. The link member is connected with the pole base assembly. The elastic rod is made of a material which is elastically bendable by external force.

Further provided is a deformation restricting means, which restricts inelastic deformation of the elastic rod by restricting bending deformation of the elastic rod to an extent that the elastic rod is deformed to a predetermined shape.

According to the present invention, a number of additional parts such as a torsion spring can be omitted, and the manufacturing process can be simplified. Also, the cost of manufacture advantageously decreases. Further, by restricting inelastic deformation of the elastic rod by the compression load during loading and unloading of the magnetic tape, reliability of the deck is improved.

The deformation restricting means preferably includes a plurality of protrusions which are protruded from the side of the elastic rod approximately at the center portion of the elastic rod, and spaced from each other along a length of the elastic rod.

The protrusions are protruded from a side of the elastic rod which is inwardly (concavely) curved during the deformation of the elastic rod.

When the elastic rod is deformed to the predetermined shape, the protrusions restrict extra deformation of the elastic rod beyond the predetermined shape by contact between leading ends of respective protrusions.

The elastic rod and the protrusions are preferably integrally formed with each other, and the elastic rod and the loading gear are preferably integrally formed with each other by molding of synthetic resin material.

Meanwhile, the deformation restricting means also preferably includes an elastic reinforcement member which reinforces the elastic recovery force of the elastic rod during the unloading of the magnetic tape.

The elastic reinforcement member is preferably an iron core which is disposed across the length of the elastic rod.

BRIEF DESCRIPTION OF THE DRAWINGS

The above objects and other features of the present invention will become more apparent by describing in detail an embodiment thereof with reference to the attached drawing figures, in which.

Throughout the drawing figures, it should be understood that like reference numerals refer to like features and structures.

DETAILED DESCRIPTION OF THE PREFERRED EMBODIMENTS

Figure 2:
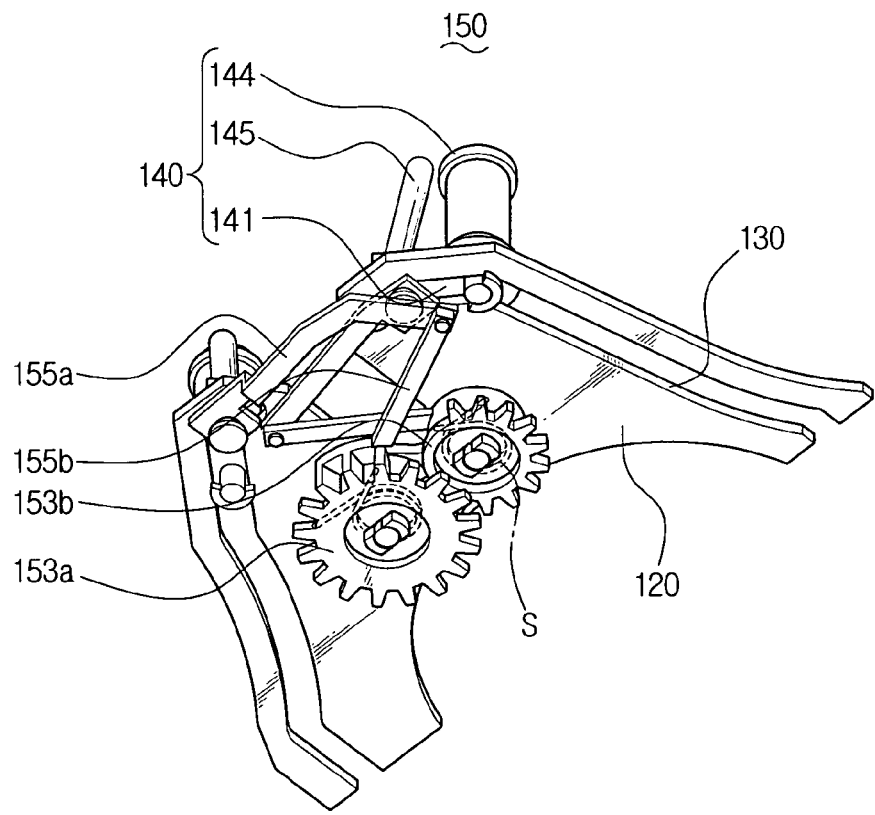
FIG. 2 is a bottom perspective view illustrating in detail the portion indicated by arrow 'A' in FIG. 1.
Figure 3:
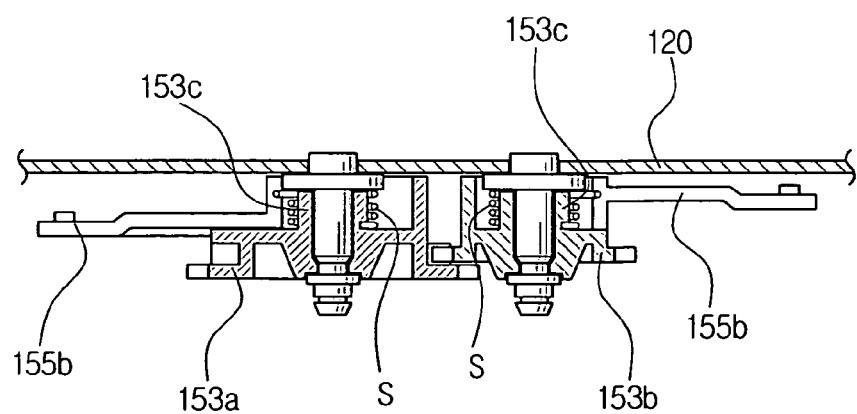
FIG. 3 is a sectional view taken on line I—I of FIG. 1, illustrating a pole base assembling driving device.

Hereinafter, the present invention will be described in detail with reference to the accompanying drawings. Throughout the description, elements having the same construction and function as those of the conventional tape recorder as described above with reference to FIGS. 1 to 3 will be referred to by the same reference numerals, and further description thereof will be omitted.

Figure 4:
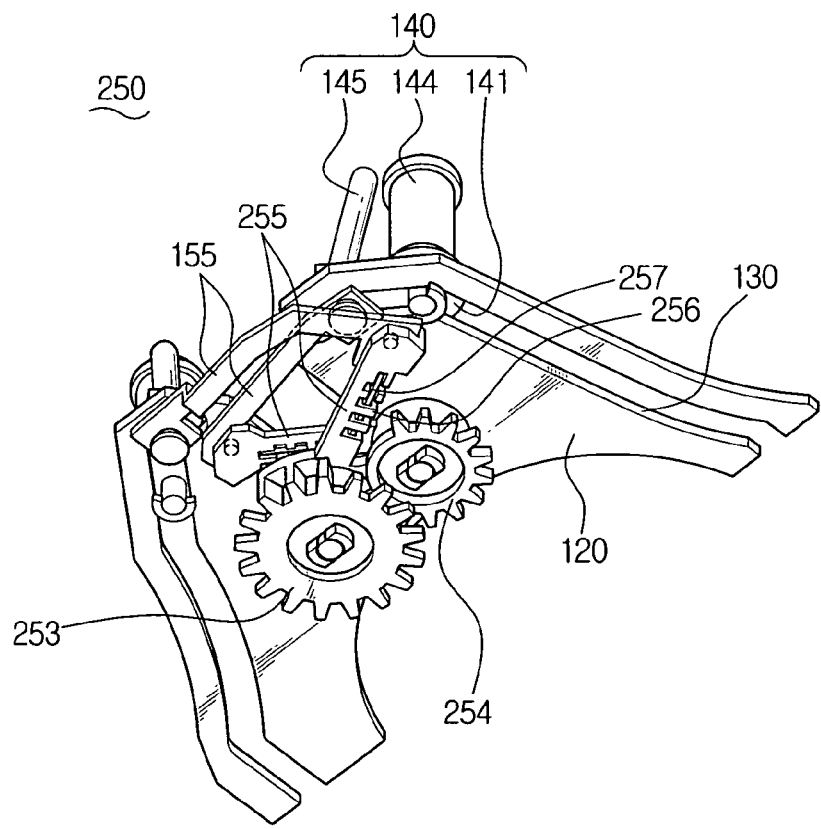
FIG. 4 is a bottom perspective view illustrating a pole base assembly driving device according to an embodiment of the present invention.

Referring to FIG. 4, a pole base assembly driving device 250 for a tape recorder according to an embodiment of the present invention includes a pole base assembly 140, first and second loading gears 253, 254, two elastic rods 255 and two link members 155.

Figure 1:
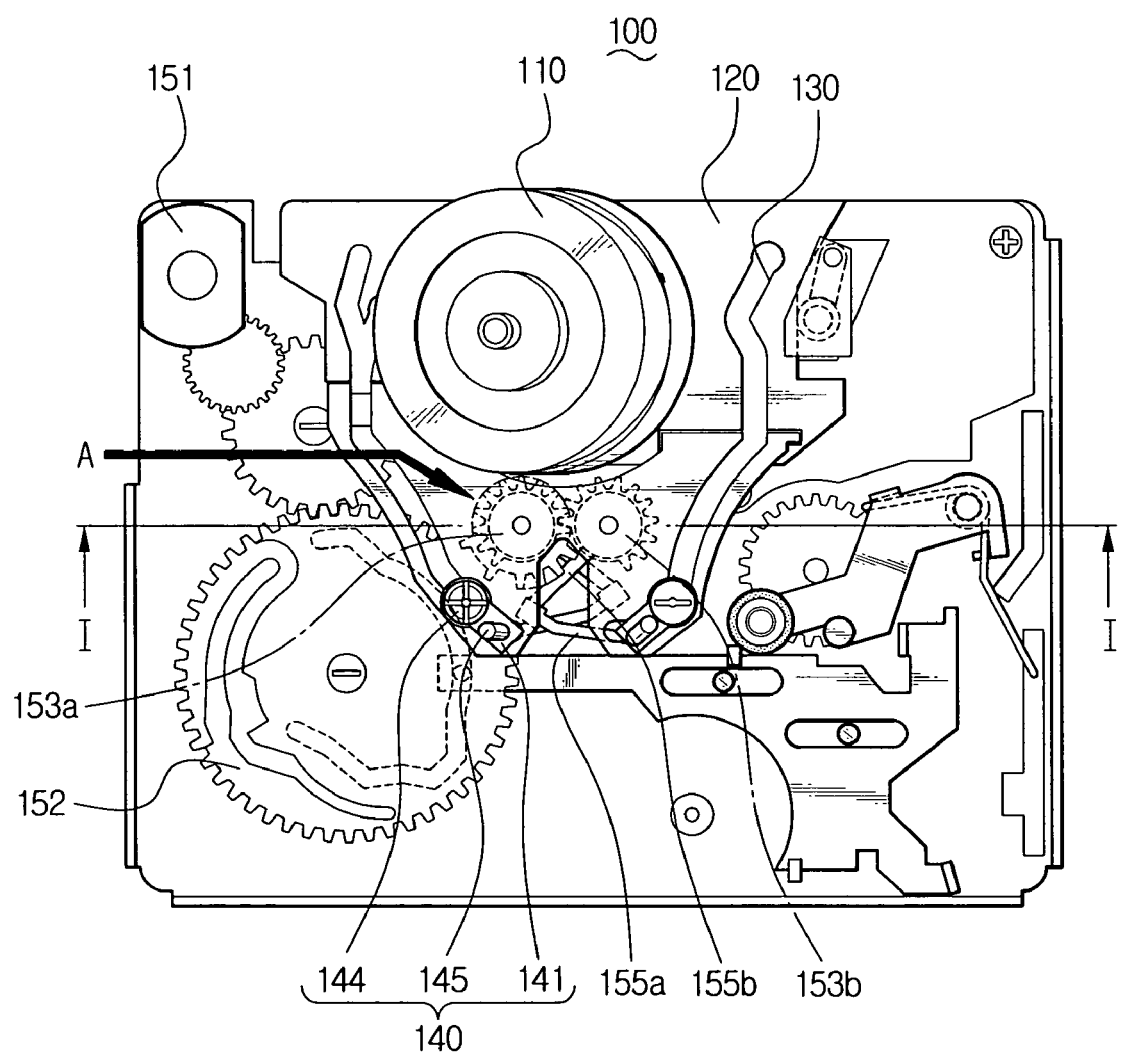
FIG. 1 is a plan view illustrating a deck of a conventional tape recorder.

More specifically, a pair of pole base assemblies 140 are slidably provided to a pair of guide rails 130 which are formed adjacent to left and right portions of a head drum 110 (FIG. 1). Each pole base assembly 140 includes a base member 141 which is slidably disposed on the guide rail 130. At least one pole member 145 and/or a roller member 144 are formed on the upper surface of the base member 141. A link member 155 is hinged to the lower surface of the base member 141. Meanwhile, the guide rails 130 are preferably integrally formed on a head drum base 120 (FIG. 1) on which the head drum 110 is seated. It should be understood that the construction of the guide rail 130 is not limited to the same depicted in this embodiment, but rather can be modified appropriately in accordance with the type of the deck 100 employed.

The first and second loading gears 253, 254 are rotatably disposed on the head drum base 120 and correspond to the pole base assemblies 140, respectively, and are rotatably driven by the force which is transmitted from the loading motor 151 (FIG. 1) via the gear train including the main gear 152 (FIG. 1). According to an embodiment of the present invention, the first loading gear 153 is engaged with the main gear 152, and is driven by the force transmitted from the loading motor 151 via the main gear 152. Also, the second loading gear 254 is engaged with the first loading gear 153, and is driven by the force transmitted from the main gear 152 via the first loading gear 253. To this end, the first loading gear 253 has a dual-gear structure consisting of a gear part tooth-engaged with the main gear 152, and another gear part tooth-engaged with the second loading gear 254. Again, the structure of the first loading gear 253 is modifiable depending on the type of the deck 100 as employed. Generally, the loading gears 253, 254 are formed of metal material, but it is preferable to form the loading gears 253, 254 with a material which is inexpensive and allows easy shaping. For example, the loading gears 253, 254 may be formed by a molding with a synthetic resin material. The loading gears 253, 254 are connected to the pole base assemblies 140 through at least one link member, and in the present embodiment, the loading gears 253, 254 are connected to the pole base assemblies 140 through the link member 155 and the elastic rod 255.

Figure 5:
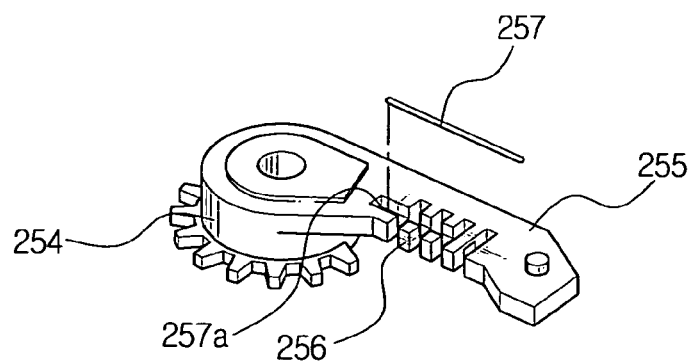
FIG. 5 is a perspective view illustrating the main portion of the pole base assembly driving device according to an embodiment of the present invention.

FIG. 5 illustrates the second loading gear 254 and an elastic rod 255 as shown in FIG. 4. Referring to FIG. 5, the elastic rod 255 is preferably integrally formed with the second loading gear 254. Accordingly, as the elastic rod 255 is protruded from a side of the second loading gear 254, one end of the elastic rod 255 is fixed to the second loading gear 254, while the other end is hinged to the link member 155 (FIG. 4). Accordingly, substituting for the conventional second link member 155b (FIG. 2), the elastic rod 255 pivotally connects the second loading gear 254 with the link member 155. It is preferable that the elastic rod 255 is made of a material which is elastically bendable by an external force. Accordingly, the elastic rod 255 is bent by the pressure which is generated when the second loading gear 254 is further driven in the magnetic tape loading direction after the pole base assemblies 140 have contacted the end of the guide rails 130 toward the head drum 110. The elastic rod 255 is preferably made by a molding of synthetic resin material. In this case, the elastic rod 255 can advantageously be formed in the process of forming the second loading gear 254.

The technical structure of the first loading gear 253 and the elastic rod 255 is similar to that of the second loading gear 254 and the elastic rod 255 as described above with reference to FIG. 5. Accordingly, the description thereof will be omitted.

Further provided is a deformation restricting means, which prevents inelastic deformation of the elastic rod 255. In the present embodiment, the elastic rod 255 is deformed by the loading gears 253, 254 only to a predetermined shape. To this end, the deformation restricting means of the present embodiment includes a plurality of protrusions 256 formed on the elastic rod 255. Preferably, the protrusions 256 are integrally formed with the elastic rod 255. Accordingly, the elastic rod 255, the protrusions 256 and one of the loading gears 253, 254 can advantageously be integrally formed by a molding of a synthetic resin material which is easy to form and also inexpensive.

The protrusions 256 are formed approximately on the middle side of the elastic rod 255, and at predetermined intervals from each other along the lengthwise direction of the elastic rod 255. More specifically, the protrusions 256 are formed on a side of the elastic rod 255, which is concave when the elastic rod 255 deforms. Further, the protrusions 256 preferably take the form of ribs on the elastic rod 255. The protrusions 256 are formed at intervals along the length of rod 255, which allow the protrusions 256 to contact respective neighboring protrusions 256 at the leading ends when the elastic rod 255 is deformed to the predetermined shape by the rotation of the loading gears 253, 254. Because the leading ends of the protrusions 256 contact each other, further undesired deformation of the elastic rod 255 can be avoided.

There is an iron core 257 functioning as an elastic reinforcement member for the elastic rod 255 so as to allow the elastic rod 255 to return to its original shape more easily during the unloading of the magnetic tape. The iron core 257 is seated on a seating groove 257a which is defined in the outer circumference of the elastic rod 255 so that the iron core 257 is disposed in the elastic rod 255 with its lengthwise direction parallel to the lengthwise direction of the elastic rod 255.

Figure 6:
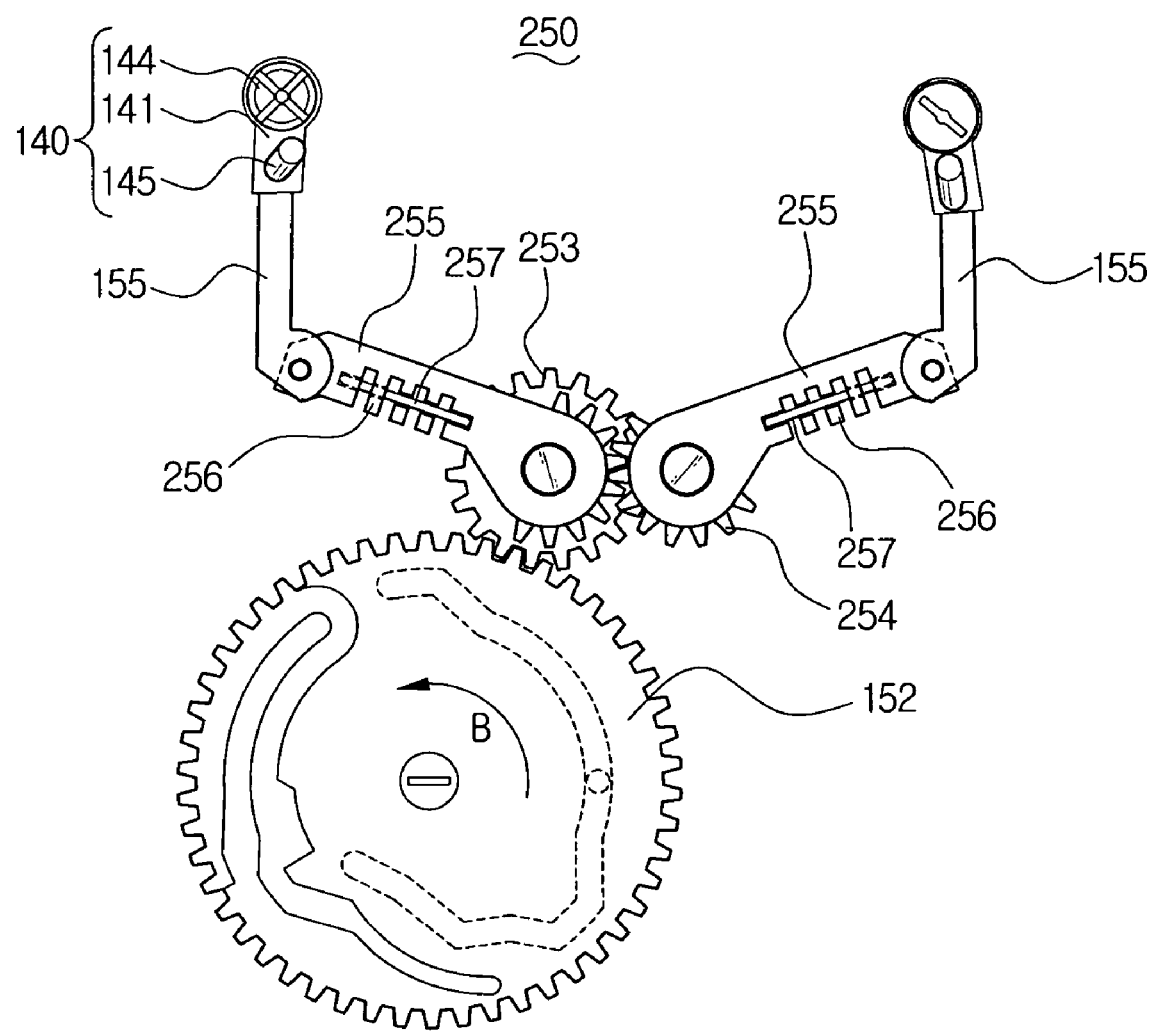
FIGS. 6 and 7 are views illustrating the operation of the pole base assembly driving device according to an embodiment of the present invention.

The operation of the pole base assembly driving device 250 according to an embodiment of the present invention will now be described in greater detail. As shown in FIG. 6, with the loading of the magnetic tape, the main gear 152 is rotated in the 'B' direction by the driving force transmitted from the loading motor 151 (FIG. 1). Accordingly, the first loading gear 253 is rotated. The second loading gear 254 is also rotated in association with the first loading gear 253. Accordingly, the pole base assemblies 140, which are connected with the first and the second loading gears 253, 254 via the elastic rod 255 and the link member 155, are moved to the ends of the guide rails 130 (FIG. 4) toward the head drum 110 (FIG. 1).

When the pole base assemblies 140 contact the ends of the guide rails 130 toward the head drum 110, the pole base assemblies 140 are prevented from moving further. However, the main gear 152 is rotated an extra rotation angle to tightly contact the pole base assemblies 140 against the ends of the guide rails 130. As a result, the first and second loading gears 253, 254 are further driven.

Figure 7:
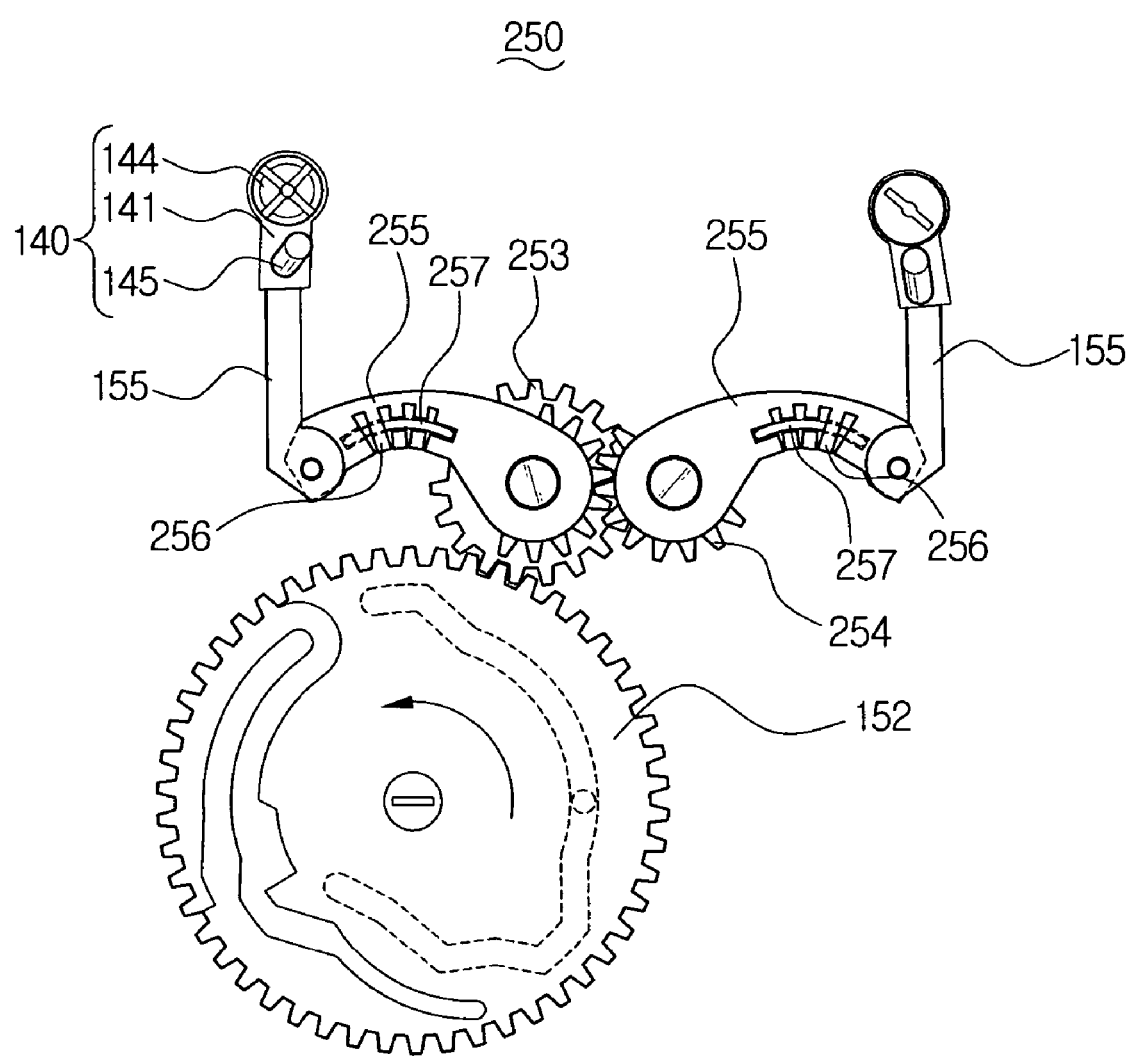

As the first and second loading gears 253, 254 are rotated, pressure is exerted inside the elastic rod 255. Accordingly, as shown in FIG. 7, the elastic rod 255 is elastically bent to tightly contact the pole base assemblies 140 to the ends of the guide rails 130, while also elastically supporting the pole base assemblies 140. The elastic rod 255 is bent by the rotation of the loading gears 253, 254. As the rotation of the loading gears 253, 254 exceeds a predetermined range, the protrusions 256 on the side of the elastic rod 255 contact with each other, thereby preventing further bending of the elastic rod 255. As a result, inelastic deformation of the elastic rod 255 due to excessive bending is avoided.

During the unloading of the magnetic tape, the loading gears 253, 254 are rotated in the reverse direction (B, FIG. 6). Accordingly, the elastic rod 255 is subject to a recovery force and returns to its original shape. At this time, as the recovery force of the iron core 257 adds to the recovery force of the elastic rod 255, the elastic rod 255 returns to its original shape more quickly.

While the present invention has been described as above with reference to a particular embodiment, this example should not be considered limiting. That is, the present invention can also be applied to other types of tape recorders such as a video tape recorder (VTR) and the like which has a loading gear rotating in the loading of magnetic tape by an extra rotation angle after the pole base assemblies are contacted at the ends of the guide rails, and a link member pivotally connecting the loading gear with the pole base assemblies.

According to the present invention as described above, instead of a conventional second link member and torsion springs, an elastic rod, which is integrally formed with a loading gear and elastically deformable by an external force, is used. As a result, time for assembling the deck is reduced, and the assembly process becomes simpler.

Further, the pressure exerted on the elastic rod due to excessive rotation of the main gear can be absorbed by the elastic bending of the elastic rod, and also the inelastic deformation of the elastic rod can be prevented due to the presence of protrusions on the side of the elastic rod and the iron core. As a result, the durability of components is prolonged, and the product reliability is ensured even for frequent loading and unloading of the magnetic tape.

Although a preferred embodiment of the present invention has been described, it will be understood by those skilled in the art that the present invention should not be limited to the described preferred embodiments. Furthermore, various changes and modifications can be made within the spirit and scope of the present invention as defined by the appended claims.

What is claimed is:

1. A pole base assembly driving device for a tape recorder, comprising:
   a pole base assembly comprising a base member, and at least one pole member disposed on an upper surface of the base member;
   a loading gear rotatably disposed on the deck, and rotated by a driving force which is transmitted from a driving source installed on the deck;
   an elastic rod connected by one end to the loading gear, and connected by the other end to a link member which is connected with the pole base assembly, the elastic rod being made of a material which is elastically bendable by an external force; and
   a deformation restricting means for restricting a deformation of the elastic rod when the elastic rod is deformed by the rotation of the loading gear.

2. The pole base assembly driving device of claim 1, wherein the deformation restricting means comprises a plurality of protrusions which are formed on a side of the elastic rod along a length direction and at predetermined intervals.

3. The pole base assembly driving device of claim 2, wherein the plurality of protrusions are formed on the side of the elastic rod which is concave when the elastic rod is bent by the rotation of the loading gear.

4. The pole base assembly driving device of claim 3, wherein the plurality of protrusions are formed in length and intervals such that when the elastic rod is deformed to a predetermined shape, the protrusions contact each other at leading ends.

5. The pole base assembly driving device of claim 2, wherein the elastic rod and the protrusions are formed integrally with each other.

6. The pole base assembly driving device of claim 5, wherein the elastic rod is formed integrally with the loading gear.

7. The pole base assembly driving device of claim 6, wherein the elastic rod and the loading gear comprise a synthetic resin material.

8. The pole base assembly driving device of claim 1, wherein the deformation restricting means comprises an elastic reinforcement member for reinforcing an elastic recovery force of the elastic rod when the elastic rod is returned to the original state during the unloading of the magnetic tape.

9. The pole base assembly driving device of claim 8, wherein the elastic reinforcement member is an iron core which is disposed along the length direction of the elastic rod.

10. A pole base assembly driving device, comprising:
a pole base assembly movably disposed on a deck so as to move along a moving path defined on the deck;
a link member being pivotally connected with one end to the pole base assembly;
a loading gear rotatably disposed on the deck;
an elastic rod connecting the link member and the loading gear, the elastic rod being made of a material which is elastically bendable by a predetermined external force; and
a deformation restricting means for restricting a deformation of the elastic rod when the elastic rod is deformed by the rotation of the loading gear.

11. The pole base assembly driving device of claim 10, further comprising a plurality of protrusions formed on a side of the elastic rod and wherein said elastic rod is concave when the elastic rod is bent by the rotation of the loading gear.

12. The pole base assembly driving device of claim 11, wherein the elastic rod and the protrusions are integrally formed with each other.

13. The pole base assembly driving device of claim 12, wherein the elastic rod is integrally formed with the loading gear.

14. The pole base assembly driving device of claim 11, further comprising an iron core which is disposed in the elastic rod along the length direction.

* * * * *